(12) United States Patent
Nishimura et al.

(10) Patent No.: US 12,392,980 B2
(45) Date of Patent: Aug. 19, 2025

(54) OPTICAL COMMUNICATION DEVICE

(71) Applicants: SHIMADZU CORPORATION, Kyoto (JP); JAPAN AGENCY FOR MARINE-EARTH SCIENCE AND TECHNOLOGY, Yokosuka (JP)

(72) Inventors: Naoki Nishimura, Kyoto (JP); Takao Sawa, Yokosuka (JP)

(73) Assignees: SHIMADZU CORPORATION, Kyoto (JP); JAPAN AGENCY FOR MARINE-EARTH SCIENCE AND TECHNOLOGY, Yokosuka (JP)

( * ) Notice: Subject to any disclaimer, the term of this patent is extended or adjusted under 35 U.S.C. 154(b) by 39 days.

(21) Appl. No.: 17/772,091

(22) PCT Filed: Dec. 5, 2019

(86) PCT No.: PCT/JP2019/047640
§ 371 (c)(1),
(2) Date: Apr. 26, 2022

(87) PCT Pub. No.: WO2021/090514
PCT Pub. Date: May 14, 2021

(65) Prior Publication Data
US 2022/0373760 A1  Nov. 24, 2022

(30) Foreign Application Priority Data

Nov. 8, 2019 (WO) .................. PCT/JP2019/043896

(51) Int. Cl.
*H04B 10/00* (2013.01)
*G02B 6/26* (2006.01)
(Continued)

(52) U.S. Cl.
CPC ............. *G02B 6/506* (2013.01); *G02B 6/262* (2013.01); *G02B 6/32* (2013.01)

(58) Field of Classification Search
CPC .......... G02B 6/506; G02B 6/262; G02B 6/32; H04B 10/67; H04B 10/80; H04B 13/02
See application file for complete search history.

(56) References Cited

U.S. PATENT DOCUMENTS

| 5,038,406 A * | 8/1991 | Titterton | H04B 10/11 |
| | | | 398/107 |
| 5,142,400 A * | 8/1992 | Solinsky | H04B 10/1127 |
| | | | 356/139.05 |

(Continued)

FOREIGN PATENT DOCUMENTS

| JP | H08-079184 A | 3/1996 |
| JP | 2005-003662 A | 1/2005 |

(Continued)

OTHER PUBLICATIONS

Written Opinion by the International Search Authority for PCT application No. PCT/JP2019/047640 dated Jan. 21, 2020, submitted with a machine translation.

(Continued)

*Primary Examiner* — Agustin Bello
(74) *Attorney, Agent, or Firm* — Muir Patent Law, PLLC

(57) ABSTRACT

This optical communication device (1) is provided with a plurality of light-receiving elements (11) and a plurality of optical fibers (12). The plurality of optical fibers each includes a light-incident end portion (12a) for communication light and a light-emission end portion (12b) for communication light. The plurality of light-emission end portions is each arranged near each of the plurality of light-receiving elements. The plurality of light-incident end portions is each configured to be capable of being arranged in a predetermined position in a predetermined direction.

14 Claims, 3 Drawing Sheets

(51) Int. Cl.
*G02B 6/32* (2006.01)
*G02B 6/50* (2006.01)

(56) References Cited

U.S. PATENT DOCUMENTS

| | | | | |
|---|---|---|---|---|
| 5,852,699 | A * | 12/1998 | Lissotschenko | G02B 6/2848 385/115 |
| 6,646,272 | B2 * | 11/2003 | Rushbrooke | G01N 21/6452 250/461.1 |
| 7,502,537 | B2 | 3/2009 | Kurahashi | B23K 1/0056 385/115 |
| 7,953,326 | B2 * | 5/2011 | Farr | H04B 13/02 398/118 |
| 8,045,859 | B2 * | 10/2011 | Bandyopadhyay | H04B 13/02 398/131 |
| 8,295,708 | B2 * | 10/2012 | Bandyopadhyay | H04B 13/02 398/104 |
| 8,340,526 | B2 * | 12/2012 | Camilli | H04B 10/272 398/104 |
| 9,031,413 | B2 * | 5/2015 | Doniec | H04L 7/0075 398/104 |
| 9,154,234 | B2 * | 10/2015 | Motley | H04B 13/02 |
| 9,294,201 | B2 * | 3/2016 | Farr | H04B 10/80 |
| 9,490,910 | B2 * | 11/2016 | Lacovara | G01V 1/226 |
| 9,490,911 | B2 * | 11/2016 | Hopewell | H04L 27/2601 |
| 10,204,514 | B2 * | 2/2019 | Baiden | G01J 1/4204 |
| 10,707,966 | B2 * | 7/2020 | Velazco | H04B 10/1129 |
| 2004/0033037 | A1 * | 2/2004 | Suzuki | G02B 6/06 385/115 |
| 2007/0166045 | A1 * | 7/2007 | Wang | G02B 27/283 398/152 |
| 2007/0183782 | A1 * | 8/2007 | Farr | H04B 13/02 398/104 |
| 2011/0058814 | A1 | 3/2011 | Camilli et al. | |
| 2012/0170935 | A1 * | 7/2012 | Machado | H04B 13/02 398/58 |
| 2015/0086206 | A1 | 3/2015 | Goldner et al. | |
| 2015/0098705 | A1 * | 4/2015 | Motley | H04B 13/02 398/104 |
| 2015/0132004 | A1 * | 5/2015 | Farr | H04B 10/80 398/104 |
| 2015/0372769 | A1 * | 12/2015 | Farr | H04B 10/80 398/104 |
| 2016/0178862 | A1 | 6/2016 | Sasada et al. | |
| 2017/0346557 | A1 | 11/2017 | Choi et al. | |
| 2018/0082578 | A1 * | 3/2018 | Baiden | G01J 1/0425 |
| 2021/0286139 | A1 | 9/2021 | Oyama | |
| 2022/0373760 | A1 * | 11/2022 | Nishimura | G02B 6/32 |

FOREIGN PATENT DOCUMENTS

| | | |
|---|---|---|
| JP | 2007-271882 A | 10/2007 |
| JP | 2016-119375 A | 6/2016 |
| JP | 2017-009382 A | 1/2017 |
| JP | 2017-228889 A | 12/2017 |
| JP | 2018-007069 A | 1/2018 |
| WO | 2018/079091 A1 | 5/2018 |

OTHER PUBLICATIONS

First Office Action dated May 14, 2021 for corresponding Taiwanese Patent Application No. TW 109136054, submitted with a machine translation.
Extended European Search Report (EESR) dated Nov. 9, 2023 in the corresponding European patent application No. 19951708.7.
Hiskett et al., "Underwater optical communications with a single photon-counting system", Proceedings of SPIE, IEEE, US, vol. 9114, May 28, 2014 (May 28, 2014), pp. 91140P-1-91140P-15, XP060037757, DOI: 10.1117/12.2050563 ISBN: 978-1-62841-730-2.

\* cited by examiner

OPTICAL COMMUNICATION DEVICE

TECHNICAL FIELD

The present invention relates to an optical communication device.

BACKGROUND OF THE INVENTION

Conventionally, an optical communication device for performing communication using communication light is known. Such an optical communication device is disclosed, for example, in Japanese Unexamined Patent Application Publication No. 2018-7069.

The above-described Japanese Unexamined Patent Application Publication No. 2018-7069 discloses a first optical communication instrument (optical communication device) mounted on a submersible navigating underwater and a second optical communication instrument (optical communication device) mounted on a marine vessel or another submersible navigating underwater. Further, the above-described Japanese Unexamined Patent Application Publication No. 2018-7069 discloses that an optical signal using communication light which is visible light is transmitted through the water between the first optical communication instrument and the second optical communication instrument. Each of the first optical communication instrument and the second optical communication instrument is provided with one or a plurality of light-receiving elements inside a housing.

PRIOR ART DOCUMENT

Patent Document

Patent Document 1: Japanese Unexamined Patent Application Publication No. 2018-7069

SUMMARY OF THE INVENTION

Problems to be Solved by the Invention

However, as described in the above-described Japanese Unexamined Patent Application Publication No. 2018-7069, in a conventional optical communication device, it is considered that each installation location of the plurality of light-receiving elements cannot be arbitrarily selected. Therefore, it is considered to be difficult to freely adjust each directivity of light received (light-receiving direction, light-receiving range, etc.) by the plurality of light-receiving elements. Therefore, it is considered that there is a disadvantage in that it is difficult to arbitrarily set the directivity of light received by the plurality of light-receiving elements as a whole. Further, as a method of arbitrarily realizing the directivity of light received by the plurality of light-receiving elements, for example, it is considered to adopt a classic method in which a black paper is placed in front of the light-receiving elements or a method in which a digital mirror device is used. However, these methods shield a part of the light reaching the light-receiving elements, and therefore, it is considered to be disadvantageous in that the methods basically worsen the performance (sensitivity) of the light-receiving elements. Therefore, it is considered that there is a problem that it is difficult to arbitrarily set the directivity of the light received by the plurality of light-receiving elements while maintaining all of the sensitivities of the plurality of light-receiving elements.

The present invention has been made to solve the above-described problems. One object of the present invention is to provide an optical communication device capable of arbitrarily setting the directivities of light received by a plurality of light-receiving elements while maintaining all of the sensitivities of the plurality of light-receiving elements.

Means for Solving the Problem

In order to attain the above-described object, the optical communication device according to one aspect of the present invention includes:
  a plurality of light-receiving elements configured to receive communication light, the plurality of light-receiving elements being provided so as to correspond to a plurality of channels; and
  a plurality of optical fibers configured to guide the communication light to the plurality of light-receiving elements, the plurality of optical fibers being provided so as to correspond to the plurality of light-receiving elements,
  wherein the plurality of optical fibers each includes a light-incident end portion for the communication light and a light-emission end portion for the communication light,
  wherein the plurality of light-emission end portions is each arranged near each of the plurality of light-receiving elements, and
  wherein the plurality of the light-incident end portions is each configured to be capable of being arranged at a predetermined position in a predetermined direction.

Note that in the specification of this application, the terminology "near each of the plurality of light-receiving elements" denotes a broad concept including both the position itself of each of the plurality of light-receiving elements and the vicinity of the position of each of the plurality of light-receiving elements.

Effects of the Invention

According to the present invention, as described above, a plurality of optical fibers for guiding communication light to a plurality of light-receiving elements is provided. The plurality of optical fibers is each configured to include a light-incident end portion for communication light and a light-emission end portion for communication light. The plurality of light-emission end portions is each arranged near each of the plurality of light-receiving elements. The plurality of light-incident end portions is each configured to be capable of being arranged at a predetermined position in a predetermined direction. With this, by using the optical fibers, it is possible to arbitrarily select the installation location where each of the plurality of light-receiving elements is installed. Further, by adjusting the positions and directions of the plurality of light-incident end portions, it is possible to freely adjust the directivity of light received (the light-receiving direction, the light-receiving range, etc.) by each of the plurality of light-receiving elements. Therefore, it is possible to arbitrarily set the directivity of light received by the plurality of light-receiving elements as a whole. Also, unlike the case of adopting a method in which a black paper is arranged in front of the light-receiving elements or a method in which a digital mirror device is used as a method for realizing the arbitral light-receiving directivity, a part of the light incident on the light-receiving elements will not be shielded, and therefore, the sensitivity of the light-receiving element do not deteriorate. Consequently, it is possible to

BRIEF DESCRIPTION OF THE DRAWINGS

FIG. 3A is a schematic diagram showing a second example of holding light-incident end portions of an optical fiber by a light-incident end portion holder of an optical communication device by a first embodiment.

EMBODIMENTS FOR CARRYING OUT THE INVENTION

Hereinafter, some embodiments in which the present invention is embodied will be described with reference to the attached drawings.

First Embodiment (Underwater Optical Communication System)

Figure 1:
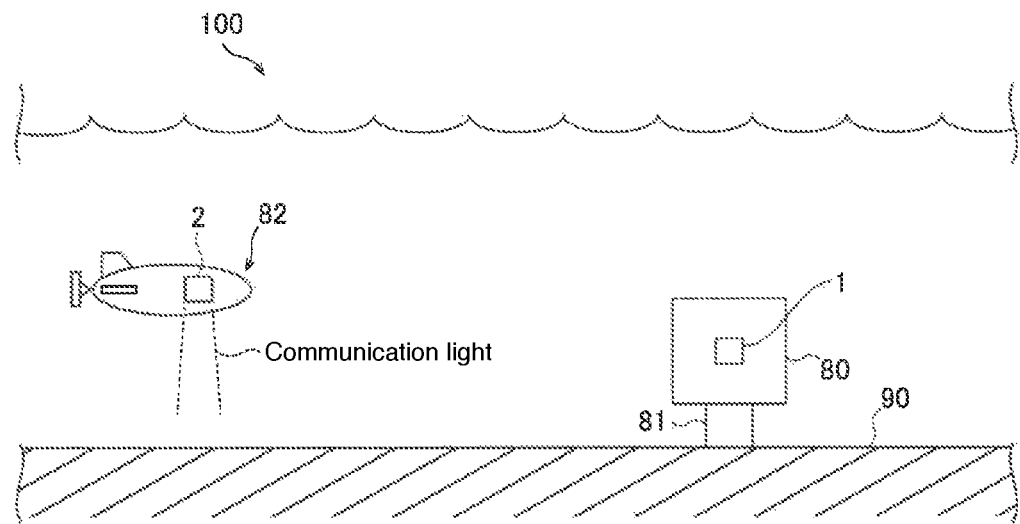
FIG. 1 is a schematic diagram showing a schematic configuration of an underwater optical communication system according to a first embodiment.

With reference to FIG. 1, a configuration of an underwater optical communication system 100 provided with an optical communication device according to a first embodiment will be described.

As shown in FIG. 1, the underwater optical communication system 100 is provided with a first optical communication device 1 and a second optical communication device 2. Note that the first optical communication device 1 is an example of the "optical communication device" recited in claims.

The first optical communication device 1 is arranged in water, such as, e.g., in the sea. Specifically, the first optical communication device 1 is mounted on a fixed body 80 fixed underwater. The fixed body 80 is fixed in water by being installed on the water bottom 90 via a holding member 81.

The second optical communication device 2 is arranged in water, such as, e.g., in the sea. Specifically, the second optical communication device 2 is mounted on a moving body 82 that moves underwater. The moving body 82 includes, for example, an AUV (Autonomous Underwater Vehicle).

In the first embodiment, the underwater optical communication system 100 is configured to be able to perform optical communication between the first optical communication device 1 and the second optical communication device 2 by receiving the communication light emitted from the first optical communication device 1 by the second optical communication device 2 and perform optical communication between the second optical communication device 2 and the first optical communication device 1 by receiving the communication light emitted from the second optical communication device 2 by the first optical communication device 1. Note that FIG. 1 illustrates an example in which the second optical communication device 2 is emitting communication light.

In the first embodiment, the moving body 82 travels through the sea to inspect, for example, structures laid on the seabed. The second optical communication device 2 is configured to transmit the inspection result acquired by a detector (not shown) mounted on the moving body 82 to the first optical communication device 1 by communication light. Further, the first optical communication device 1 is configured to receive the inspection result transmitted from the second optical communication device 2 and transmit the received inspection result to a communication device provided on land, a mother ship, or the like. Note that in a case where optical communication is performed between the first optical communication device 1 and the second optical communication device 2, the optical communication is performed by moving the moving body 82 to the communicable region.

Figure 2:
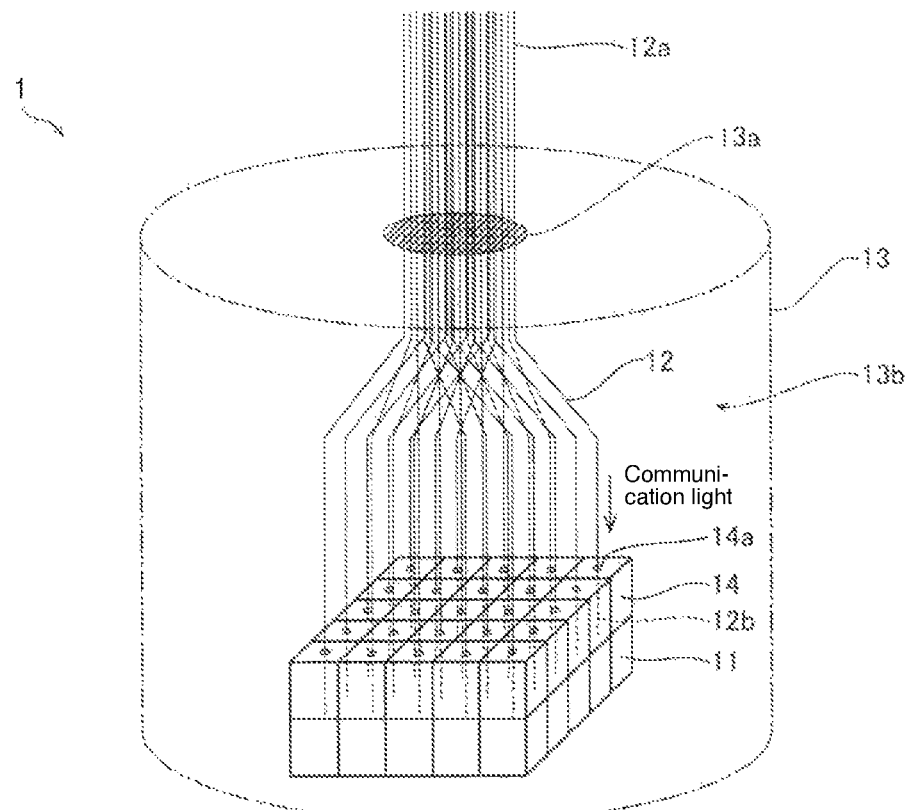
FIG. 2 is a schematic diagram showing a configuration of a light-receiving unit of an optical communication device according to a first embodiment.

As shown in FIG. 2, the first optical communication device 1 is provided with a plurality of light-receiving elements 11. The plurality of light-receiving elements 11 is configured to receive communication light. The plurality of light-receiving elements 11 is provided so as to correspond to a plurality of channels. Although the number of channels is not particularly limited, in the example shown in FIG. 2, the first optical communication device 1 is provided with twenty-five (25) channels. Therefore, in the example shown in FIG. 2, the first optical communication device 1 is provided with twenty-five (25) light-receiving elements 11.

The plurality of light-receiving elements 11 is each configured by, for example, a photomultiplier tube. In this instance, each of the plurality of light-receiving elements 11 includes a photoelectric converter and an electronic multiplier. The photoelectric converter is configured to convert the communication light into electrons. The electronic multiplier is configured to multiply the converted electrons. Further, the plurality of light-receiving elements 11 is arranged in an array. Note that the term "arranged in an array" denotes a concept including "arranged in a row," "arranged in a matrix," and the like. In the example shown in FIG. 2, the plurality of light-receiving elements 11 is arranged in a matrix of 5×5.

Further, the first optical communication device 1 is provided with a plurality of optical fibers 12. The plurality of optical fibers 12 is configured to guide communication light to the plurality of light-receiving elements 11. The plurality of optical fibers 12 is provided so as to correspond to the plurality of light-receiving elements 11. That is, in the example shown in FIG. 2, twenty-five optical fibers 12 are provided. Further, the plurality of optical fibers 12 each include a light-incident end portion 12a (light-focusing end portion) for communication light and a light-emission end portion 12b for communication light.

Here, in the first embodiment, the plurality of light-emission end portions 12b are each arranged near each of the plurality of light-receiving elements 11. The plurality of light-emission end portions 12b are each arranged so as to face the light-receiving surface of each of the plurality of light-receiving elements 11. Further, the plurality of light-incident end portions 12a are each configured to be capable of being arranged at a predetermined position in a predetermined direction. The plurality of light-incident end portions 12a is configured to be capable of being arranged at positions different from each other in predetermined directions different from each other. That is, at least some of the plurality of light-incident end portions 12a can be arranged at positions different from each other in predetermined directions different from each other. Note that the plurality of light-incident end portions 12a may be each provided with a small lens for focusing communication light. In this case, communication light can be focused on the light-incident end portion 12a by the lens, and therefore, it is possible to more reliably perform optical communication.

Further, the first optical communication device 1 is provided with a protection container 13 (shown by dashed double-dashed lines). The protection container 13 is arranged in water and is configured to accommodate the plurality of light-receiving elements 11. The protection container 13 is a sealed pressure-resistant container. The protection container 13 is configured to isolate the plurality of light-receiving elements 11 from the external environment. The protection container 13 has, for example, a cylindrical configuration.

The plurality of optical fibers 12 is configured such that the light-emission end portions 12b are provided inside the protection container 13 and the light-incident end portions 12a are provided outside the protection container 13 (i.e., underwater). Each of the plurality of light-incident end portions 12a is configured to be capable of being arranged at a predetermined position in a predetermined direction outside (underwater) the protection container 13. The plurality of optical fibers 12 is arranged so as to extend from the inside to the outside of the protection container 13 via the insertion portion 13a of the protection container 13. The insertion portion 13a is configured to allow the plurality of optical fibers 12 to be inserted therethrough while maintaining the inner space 13b of the protection container 13 in a sealed state.

Further, the first optical communication device 1 is provided with light-emission end portion holders 14. The light emission end portion holders 14 are configured to hold the plurality of light-emission end portions 12b near the plurality of light-receiving elements 11. A plurality of light-emission end portion holders 14 is provided so as to correspond to the plurality of light-receiving elements 11 and a plurality of light-emission end portions 12b. In the example shown in FIG. 2, twenty-five light-emission end portion holders 14 are provided. Each of the plurality of light-emission end portion holders 14 is provided integrally with the light-receiving surface of the plurality of light-receiving elements 11. Each of the plurality of light-emission end portion holders 14 has an insertion hole 14a. The insertion hole 14a is configured to allow the light-emission end portion 12b to be inserted therethrough. Each of the plurality of light-emission end portions 12b is configured to be held by the light-emission end portion holder 14 in a state of being inserted into the insertion hole 14a.

Figure 3A:
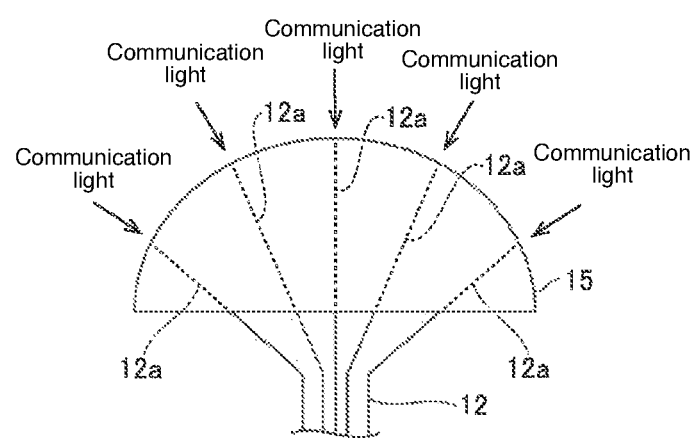
FIG. 3A is a schematic diagram showing a first example of holding light-incident end portions of optical fibers by a light-incident end portion holder of an optical communication device according to a first embodiment.
Figure 3B:
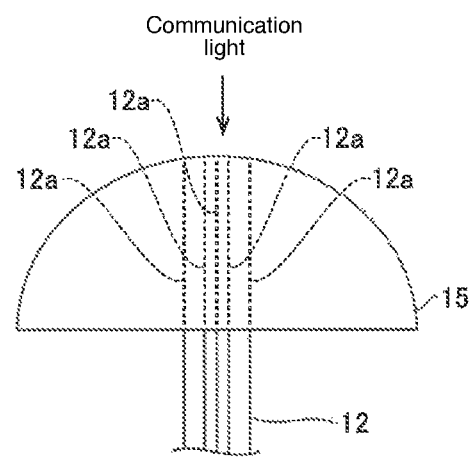

Further, as shown in FIGS. 3A and 3B, the first optical communication device 1 is provided with a light-incident end portion holder 15. The light-incident end portion holder 15 is configured to hold at least a part of the plurality of light-incident end portions 12a. The number of the light-incident end portions 12a held by the light-incident end portion holder 15 is not particularly limited. In the example shown in FIGS. 3A and 3B, an example is shown in which the light-incident end portion holder 15 holds five light-incident end portions 12a. The light-incident end portion holder 15 is configured to hold the light-incident end portions 12a such that the light-incident end portions 12a are arranged in predetermined directions.

In a case where the directivity of light received by the light-receiving elements 11 (in a case where it is desired to receive communication light in a wide range), for example, the light-incident end portions 12a can be arranged like the arrangement example shown in FIG. 3A. In the example shown in FIG. 3A, at least some of the plurality of light-incident end portions 12a are arranged in directions different from each other. Further, in a case where the directivity of light received by the light-receiving elements 11 is decreased (in a case where it is desired to receive communication light from a particular direction), for example, the light-incident end portions 12a can be arranged like the arrangement example shown in FIG. 3B. In the embodiment shown in FIG. 3B, at least some of the plurality of light-incident end portions 12a are arranged in the same direction.

(Usage Example of Optical Communication Device)

Next, with reference to FIG. 4, the usage example of the first optical communication device 1 in water will be described.

Figure 4:
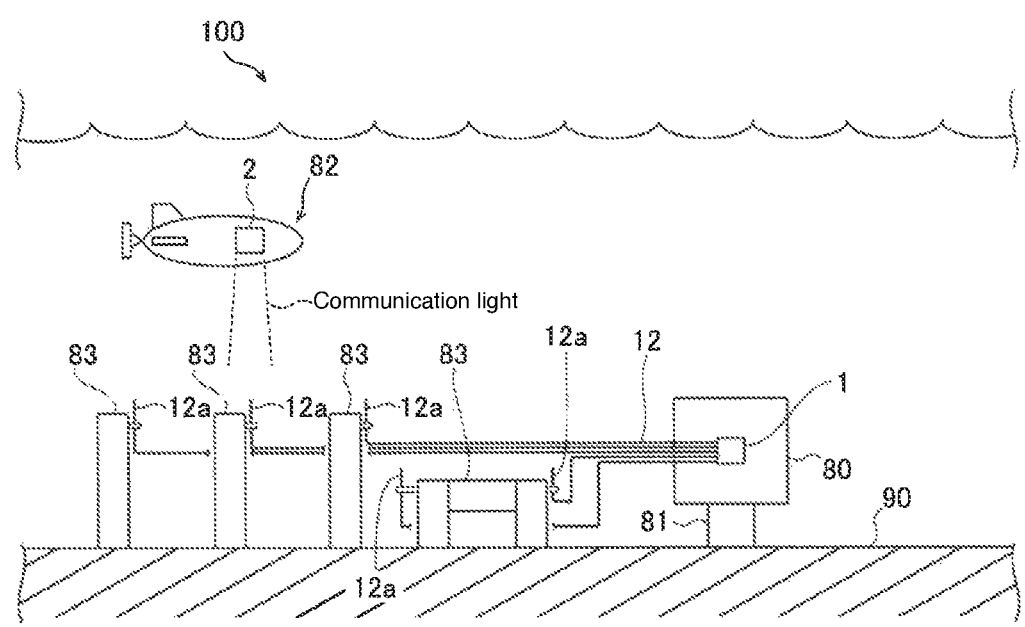
FIG. 4 is a schematic diagram showing an arrangement example of optical fibers of an optical communication device according to a first embodiment.

As shown in FIG. 4, at least some of the plurality of light-incident end portions 12a are arranged at different positions in water. The number of arrangement positions of the light-incident end portions 12a is not particularly limited. But, in the example shown in FIG. 4, an example is shown in which the plurality of light-incident end portions 12a is arranged at five positions different from each other. In this instance, the moving body 82 can perform optical communication at five positions different from each other.

Further, at least some of the plurality of light-incident end portions 12a are attached to underwater structures 83. The underwater structure 83 is not specifically limited, and may be, for example, a column, a rod, a wall, etc. As the underwater structure 83, a structure may be provided for the first optical communication device 1, or an existing structure may be used. The light-incident end portion 12a is attached to the underwater structure 83 via a fixture.

Effects of First Embodiment

In the first embodiment, the following effects can be obtained.

In the first embodiment, as described above, the first optical communication device 1 is provided with a plurality of optical fibers 12 for guiding communication light to the plurality of light-receiving elements 11. Each of the plurality of optical fibers 12 is configured to include the light-incident end portion 12a for communication light and the light-emission end portion 12b for communication light. Each of the plurality of light-emission end portions 12b is arranged near each of the plurality of light-receiving elements 11. Each of the plurality of light-incident end portions 12a is configured to be capable of being arranged at a predetermined position in a predetermined direction. With this, by using the optical fibers 12, it is possible to arbitrarily select the installation location where each of the plurality of light-receiving elements 11 is installed. Further, by adjusting the positions and the directions of the plurality of light-incident end portions 12a, it is possible to freely adjust the directivity of light received (the light-receiving direction, the light-receiving range, etc.) by each of the plurality of light-receiving elements 11. Therefore, it is possible to arbitrarily set the directivity of light received by the plurality of light-receiving elements 11 as a whole. Further, as a method for realizing an arbitral light-receiving directivity, unlike the case of adopting a method in which a black paper is arranged in front of the light-receiving elements or a method in which a digital mirror device is used, the part of the light incident to the light-receiving elements will not be shielded, and therefore, the sensitivities of the light-receiving elements do not deteriorate. Consequently, it is possible to arbitrarily set the directivities of light received by a plurality of light-receiving elements while maintaining all of the sensitivities of the plurality of light-receiving elements.

Further, in the first embodiment, as described above, the first optical communication device 1 is configured to include the protection container 13 to be arranged in water for accommodating the plurality of light-receiving elements. With this, the plurality of light-receiving elements 11 is accommodated in a single protection container 13. Therefore, unlike the case of arranging a plurality of light-receiving elements 11 in the plurality of protection containers 13 in a dispersed manner, cables (power cables, signal cables, etc.) used for the plurality of light-receiving elements 11) can be organized into one cable, and the number of protection containers 13 can be reduced. Further, the total weight can also be reduced. Further, since the light-incident end portion 12a is small and light, it can be installed in a place where it is difficult to arrange the protection container 13. For this reason, the light-incident end portions 12a can be densely arranged in one place to improve the sensitivities. These effects are particularly effective when optical communication is performed in water. The plurality of optical fibers 12 is configured such that the light-emission end portions 12b are provided inside the protection container 13 and the light-incident end portions 12a are provided outside the protection container 13. With this, even in a case where the plurality of light-receiving elements 11 are accommodated in the protection container 13, the plurality of light-incident end portions 12a of the optical fibers 12 can be arranged at any positions in any directions outside the protection container 13. Therefore, it is possible to easily ensure the flexibility of adjusting the directivities of light received by the plurality of light-receiving elements 11.

Further, in the first embodiment, as described above, at least some of the plurality of light-incident end portions 12a are arranged at positions different from each other in water. With this, since communication light can be received at positions different from each other in water, even without providing a plurality of optical communication devices, it is possible to perform optical communication at positions different from each other in water by only a single first optical communication device 1. Consequently, as compared with the case in which a plurality of optical communication devices is provided, underwater optical communication can be performed more easily.

Further, in this embodiment, as described above, the light-incident end portions 12a are configured to receive communication light from the moving body 82 that moves in water. With this, the moving body 82 can perform optical communication at any positions out of positions different from each other in water, and therefore, underwater optical communication with the moving body 82 can be easily performed.

Further, in the first embodiment, as described above, at least some of the plurality of light-incident end portions 12a are attached to underwater structures 83. With this, the light-incident end portions 12a can be fixed to the underwater structures 83, so that the positions of the light-incident end portions 12a can be fixed at the fixed positions. Consequently, as compared with the case in which the positions of the light-incident end portions 12a are not fixed in place, underwater optical communication can be performed more easily. Further, by using an existing underwater structure 83, there is no need to prepare an additional structure for fixing.

Further, in the first embodiment, as described above, a plurality of light-receiving elements 11 is arranged in an array. With this, the light-receiving elements 11 can be aligned inside the protection container 13, and therefore, the light-receiving elements 11 can be compactly accommodated inside the protection container 13.

Further, in the first embodiment, as described above, the first optical communication device 1 is configured to include light-emission end portion holders 14 for holding the plurality of light-emission end portions 12b near the plurality of light-receiving elements 11. With this, the position of the light-emission end portion 12b can be held, and therefore, it is possible to hold the relative position between the light-emission end portion 12b and the light-receiving element 11. Consequently, it is possible to accurately receive communication light from the light-emission end portion 12b by the light-receiving element 11.

Second Embodiment

Next, with reference to FIG. 5, a second embodiment of the present invention will be described. In the second embodiment, an example will be described in which in addition to the above-described configuration of the first embodiment, a lens and a lens holder are further provided. Note that the same reference numeral is allotted to the same configuration as that of the first embodiment in the drawings, and the description thereof will be omitted.

(Configuration of First Optical Communication Device)

Figure 5:
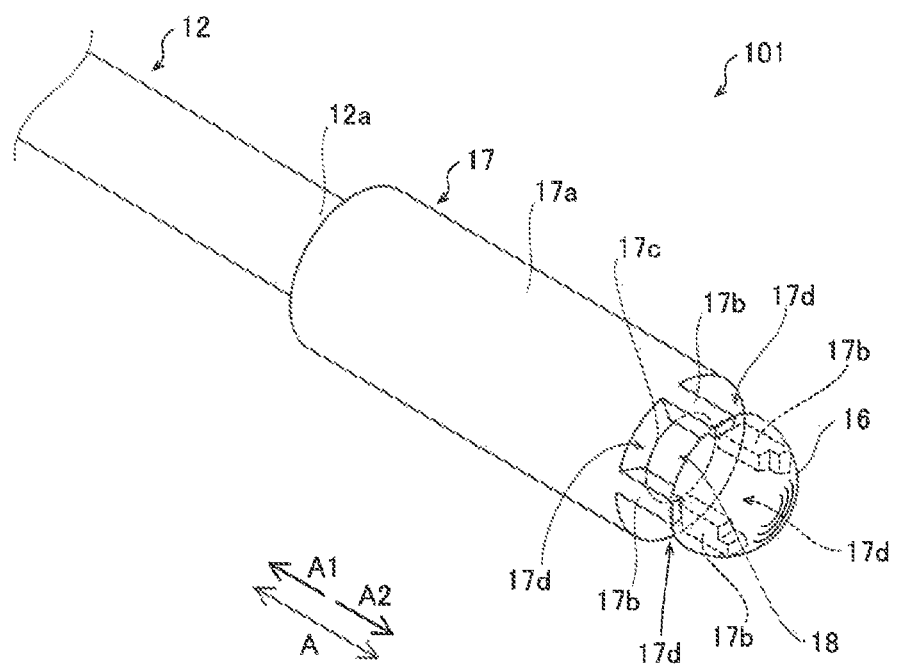
FIG. 5 is a schematic perspective view showing a lens and a lens holder of an optical communication device according to a second embodiment.

In a second embodiment, a first optical communication device 101 differs from the first optical communication device 1 of the first embodiment in that the device is further provided with a lens 16 and a lens holder 17, as shown in FIG. 5. Note that the first optical communication device 101 is an example of the "optical communication device" recited in claims.

The lens 16 is configured to focus communication light on the light-incident end portion 12a of the optical fiber 12. The lens 16 is provided at the light-incident surface of the light-incident end portion 12a so as to face in the A-direction.

The lens holder 17 is provided at the light-incident end portion 12a and is configured to hold the lens 16. The light-incident end portion 12a, the lens 16, and the lens holder 17 of the optical fiber 12 are configured to be arranged in water (in the sea).

The lens holder 17 includes a main body 17a, a support portion 17b, a light-incident opening 17c, and a water introduction portion 17d.

The main body 17a has a columnar shape extending along the A-direction. Specifically, the main body 17a has a cylindrical shape. More specifically, the main body 17a has a hollow cylindrical shape. The main body 17a has an insertion opening (not shown) for inserting the light-incident end portion 12a of the optical fiber 12 into the inside of the main body 17a at the end portion in the A1-direction. The main body 17a is configured to hold the light-incident end portion 12a of the optical fiber 12 inserted therein through the insertion opening. Further, the main body 17a has a light-incident opening 17c at the end portion in the A2-direction.

The support portion 17b is configured to support the lens 16. The support portion 17b is provided so as to protrude in the A2-direction from the end portion of the main body 17a in the A2-direction. The support portion 17b is configured to support the lens 16 at a position spaced apart in the A2 direction from the end portion of the main body portion 17a in the A2-direction. Therefore, between the lens 16 and the main body 17a (the light-incident opening 17c) in the A-direction, a space 18 is formed. A plurality of (four in FIG. 5) support portions 17b is provided.

The light-incident opening 17c is configured to allow the communication light focused by the lens 16 to enter into the inside of the main body 17a.

Here, in the second embodiment, the lens holder 17 has a configuration in which water enters between the light-incident end portion 12a and the lens 16. That is, the lens holder 17 is provided with water introduction portions 17d capable of introducing the surrounding water (such as, e.g., seawater), the water introduction portion 17d being provided between the light-incident end portion 12a (light-incident opening 17c) and the lens 16. Specifically, the water introduction portion 17d is provided so as to communicate the surroundings with the space 18. The water introduction portion 17d is configured to introduce water between the light-incident end portion 12a (the light-incident opening 17c) and the lens 16 by introducing water from the surrounding into the space 18, when placed in water. The water introduction portion 17d is provided between the support portion 17b and the support portion 17b arranged adjacent to each other. A plurality of (four in FIG. 5) water introduction portions 17d is provided.

In the second embodiment, the lens holder 17 has a structure considering the refractive index of water. Specifically, the lens holder 17 is configured to hold the lens 16 in a position considered based on the refractive index of water. That is, the lens holder 17 is configured to hold the lens 16 at a position (a position spaced from the light-incident end portion 12a) farther in the A2-direction, as compared with the case in which the refractive index of air is considered. That is, the lens holder 17 is formed to be larger in the separation distance in the A-direction between the light-incident end portion 12a and the lens 16 than the separation distance in the A-direction between the light-incident end portion 12a and the lens 16 when assuming the refractive index of air. With this, it is possible to correctly focus the communication light on the position of the light-incident end portion 12a even in water.

The rest of the configuration of the second embodiment is the same as that of the first embodiment.

Effects of Second Embodiment

In the second embodiment, the following effects can be obtained.

In the second embodiment, as described above, the first optical communication device 101 is configured such that it is provided with a lens 16 for focusing the communication light on the light-incident end portion 12a and a lens holder 17 for holding the lens 16, the lens holder 17 being provided to the light-incident end portion 12a. Further, the light-incident end portion 12a, the lens 16, and the lens holder 17 are configured to be arranged in water. The lens holder 17 is configured to include the water introduction portion 17d capable of introducing surrounding water, the water introduction portion 17d being provided between the light-incident end portion 12a and the lens 16. With this, even in the case of arranging the light-incident end portion 12a, the lens 16, and the lens holder 17 in water, there is no need to make the lens holder 17 a pressure-resistant structure (structure that withstands water pressure). Therefore, as compared with the case of making the lens holder 17 a pressure-resistant structure, it is possible to reduce the size and weight of the lens holder 17.

Note that other effects of the second embodiment are the same as those of the first embodiment.

Modifications

It should be understood that the embodiments disclosed here are examples in all respects and are not restrictive. The scope of the present invention is shown by claims rather than the descriptions of the embodiments described above, and includes all changes (modifications) within the meaning and scope equivalent to the claims.

For example, in the above-mentioned first and second embodiments, an example is shown in which the optical communication device is used in the sea, but the present invention is not limited thereto. For example, the optical communication device may be used in water (a lake, a dam, etc.) other than undersea. Further, the optical communication device may also be used in environments (on land) other than underwater.

Further, in the above-mentioned first and second embodiments, an example is shown in which the light-receiving element is configured by a photomultiplier tube, but the present invention is not limited thereto. For example, the light-receiving element may be configured by an avalanche photodiode.

Further, in the first and second embodiments, an example is shown in which the optical communication device is provided with the light-incident end portion holder, but the present invention is not limited thereto. In the present invention, the optical communication device is not required to include a light-incident end portion holder. In this case, for example, the plurality of light-incident end portions may be attached to mounting objects, such as, e.g., underwater structures, so as to be arranged in predetermined directions.

Further, in the first and second embodiments described above, an example is shown in which at least some of the plurality of light-incident end portions are arranged in water at positions different from each other, but the present invention is not limited thereto. For example, all of the plurality of light-incident end portions may be arranged at one location in the water.

Further, in the first and second embodiments described above, an example is shown in which at least some of the plurality of light-incident end portions are attached to underwater structures other than fixed bodies, but the present invention is not limited thereto. For example, at least some of the plurality of light-incident end portions may be attached to a fixed body, a protection container, or the like.

Further, in the above-mentioned first and second embodiments, an example is shown in which communication light from a moving body moving in the water is incident on the light-incident end portion, but the present invention is not limited thereto. For example, the communication light from another fixed body may be incident on the light-incident end portion.

Further, in the above-mentioned first and second embodiments, an example is shown in which the optical communication device is mounted on the fixed body fixed in water, but the present invention is not limited thereto. For example, the optical communication device may be provided on a moving body that moves through the water. In this instance, at least some of the plurality of light-incident end portions may be arranged at positions of the moving body different from with each other, or all of the plurality of light-incident end portions may be arranged at a single location of a moving body.

Further, in the first and second embodiments, an example is shown in which the plurality of light-receiving elements is accommodated in a single protection container, but the present invention is not limited thereto. In the present invention, a plurality of light-receiving elements may be accommodated in a plurality of protection containers in a distributed manner. However, from the viewpoint of simplifying the configuration of the optical communication device, it is preferable that a plurality of light-receiving elements be accommodated in a single protection container.

Further, in the first and second embodiment examples, an example is shown in which a plurality of light-receiving elements is arranged in an array, but the present invention is not limited thereto. For example, a plurality of light-receiving elements may be arranged in a distributed manner.

Further, in the first and second embodiments described above, an example is shown in which a plurality of light-emission end portion holders is provided, but the present invention is not limited thereto. For example, the light-emission end portion holder may be a single member that holds a plurality of light-emission end portions.

Further, in the first and second embodiments described above, an example is shown in which the moving body is an AUV (Autonomous Underwater Vehicle), but the present invention is not limited thereto. For example, the moving body may be a HOV (Human Occupied Vehicle). Further, the moving body may be a remotely controlled robot (ROV: Remotely Operated Vehicle) operated by a person via a cable. Further, the moving body may be a ship other than the above.

Aspects

It will be understood by those skilled in the art that the above-described exemplary embodiments are concrete examples of the following aspects.

Item 1

An optical communication device comprising:
a plurality of light-receiving elements configured to receive communication light, the plurality of light-receiving elements being provided so as to correspond to a plurality of channels; and
a plurality of optical fibers configured to guide the communication light to the plurality of light-receiving elements, the plurality of optical fibers being provided so as to correspond to the plurality of light-receiving elements,
wherein the plurality of optical fibers each includes a light-incident end portion for the communication light and a light-emission end portion for the communication light,
wherein the plurality of light-emission end portions is each arranged near each of the plurality of light-receiving elements, and
wherein the plurality of the light-incident end portions is each configured to be capable of being arranged at a predetermined position in a predetermined direction.

Item 2

The optical communication device as recited in the above-described Item 1, further comprising:
a protection container configured to accommodate the plurality of light-receiving elements, the protection container being configured to be arranged in water,
wherein the plurality of optical fibers is each configured such that the light-emission end portion is provided inside the protection container and the light-incident end portion is provided outside the protection container.

Item 3

The optical communication device as recited in the above-described Item 2,
wherein at least some of the plurality of light-incident end portions are arranged at positions different from each other in water.

Item 4

The optical communication device as recited in the above-described Item 3,
wherein the light-incident end portion is configured such that the communication light from a moving body that moves in water is incident on the light-receiving end portion.

Item 5

The optical communication device as recited in any one of the above-described Items 2 to 4,
wherein at least some of the plurality of light-incident end portions are attached to underwater structures.

Item 6

The optical communication device as recited in any one of the above-described Items 2 to 5,
wherein the plurality of light-receiving elements is arranged in an array.

Item 7

The optical communication device as recited in any one of the above-described Items 1 to 6, further comprising:
a light-emission end portion holder configured to hold each of the plurality of light-emission end portions near each of the plurality of light-receiving elements.

Item 8

The optical communication device as recited in any one of the above-described Items 1 to 7, further comprising:
a lens configured to focus the communication light on the light-incident end portion; and
a lens holder configured to hold the lens, the lens holder being provided at the light-incident end portion,
wherein the light-incident end portion, the lens, and the lens holder are configured to be arranged in water, and
wherein the lens holder includes a water introduction portion capable of introducing surrounding water, the water introduction portion being provided between the light-incident end portion and the lens.

DESCRIPTION OF SYMBOLS 1, 101: First optical communication device (optical communication device)
11: Light-receiving element
12: Optical fiber
12a: Light-incident end portion 12b: Light-emission end portion
13: Protection container
14: Light-emission end portion holder
16: Lens
17: Lens holder
17d: Water introduction portion
82: Moving body
83: Underwater structure

The invention claimed is:

1. An optical communication device comprising:
a plurality of light-receiving elements configured to receive communication light, the plurality of light-receiving elements being provided so as to correspond to a plurality of channels; and
a plurality of optical fibers having a one to one correspondence for each of the light-receiving elements, configured to guide the communication light to the plurality of light-receiving elements, each of the plurality of optical fibers being provided so as to guide communication light to a corresponding one of the plurality of light-receiving elements,
wherein each optical fiber of the plurality of optical fibers includes a light-incident end portion for the communication light and a light-emission end portion for the communication light,
wherein each light-emission end portion of the plurality of light-emission end portions is arranged so as to face a light-receiving surface of a corresponding light-receiving element of the plurality of light-receiving elements,
wherein the plurality of the light-incident end portions is each configured to be capable of being arranged at a predetermined position in a predetermined direction, and
wherein the light-incident end portions is configured such that the communication light from a moving body that moves in water is incident on the light-incident end portion.

2. The optical communication device as recited in claim 1, further comprising:
a protection container configured to accommodate the plurality of light-receiving elements, the protection container being configured to be arranged in water,
wherein the plurality of optical fibers is each configured such that the light-emission end portion is provided inside the protection container and the light-incident end portion is provided outside the protection container.

3. The optical communication device as recited in claim 2,
wherein at least some of the plurality of light-incident end portions are arranged at positions different from each other in water.

4. The optical communication device as recited in claim 2,
wherein at least some of the plurality of light-incident end portions are attached to underwater structures.

5. The optical communication device as recited in claim 2,
wherein the plurality of light-receiving elements is arranged in an array.

6. The optical communication device as recited in claim 1, further comprising:
a light-emission end portion holder configured to hold each of the plurality of light-emission end portions near each of the plurality of light-receiving elements.

7. The optical communication device as recited in claim 1, further comprising:
a lens configured to focus the communication light on the light-incident end portion; and
a lens holder configured to hold the lens, the lens holder being provided to the light-incident end portion,
wherein the light-incident end portion, the lens, and the lens holder are configured to be arranged in water, and
wherein the lens holder includes a water introduction portion capable of introducing surrounding water, the water introduction portion being provided between the light-incident end portion and the lens.

8. An optical communication device comprising:
a plurality of optical fibers, each optical fiber of the plurality of optical fibers dedicated to a corresponding channel of a plurality of channels and having a light-incident end and a light-emission end; and
a plurality of light-receiving elements, each light-receiving element of the plurality of light-receiving elements having a photoelectric converter and dedicated to a respective corresponding channel of the plurality of channels and arranged to receive a communication light transmitted from the light-emission end of an optical fiber dedicated to the channel, and
wherein each light incident end of the plurality of optical fibers is arranged at a predetermined position independent from one another and at a predetermined direction independent from one another to receive the communication light from a body moving in water,
wherein each light-emission end of the plurality of optical fibers is arranged to face a light receiving surface of a corresponding light-receiving element of the plurality of light-receiving elements to transmit the communication light thereto, and
wherein the plurality of optical fibers is configured such that a communication light from a moving body that moves in water is incident on at least one of the light-incident ends.

9. The optical communication device as recited in claim 8, further comprising:
a protection container housing the plurality of light-receiving elements, the protection container being configured to be located in water,
wherein the plurality of optical fibers is configured such that the light-emission ends are located within the protection container and the light-incident ends are located outside the protection container.

10. The optical communication device as recited in claim 9,
wherein at least one light-incident end of the plurality of optical fibers is arranged at a position different than at least one other light-incident end of the plurality of optical fibers.

11. The optical communication device as recited in claim 9,
wherein at least one light-incident end of the plurality of optical fibers is attached to an underwater structure.

12. The optical communication device as recited in claim 9,
wherein the plurality of light-receiving elements is arranged as an array of light-receiving elements.

13. The optical communication device as recited in claim 8, further comprising:
a light-emission end holder configured to hold each light-emission end of the plurality of optical fibers near a corresponding light-receiving element of the plurality of light-receiving elements.

14. The optical communication device as recited in claim 8, further comprising:

a lens configured to focus a communication light on a light-incident end of an optical fiber of the plurality of optical fibers; and a lens holder configured to hold the lens and being secured to the light-incident end, wherein the light-incident end, the lens, and the lens holder are configured to be located in water, and wherein the lens holder includes a water introduction portion for introducing surrounding water, the water introduction portion being provided between the light-incident end and the lens.

* * * * *